United States Patent [19]

Filter et al.

[11] 3,890,173

[45] June 17, 1975

[54] SOLID PROPELLANT CONTAINING ETHYLENE-CARBOXYLIC ACID POLYMERS CURED WITH AZERIDINE-BASED RESINS

[75] Inventors: Harold E. Filter, Midland; Harvey D. Bidlack, Shepherd, both of Mich.

[73] Assignee: The Dow Chemical Company, Midland, Mich.

[22] Filed: Nov. 29, 1968

[21] Appl. No.: 780,948

[52] U.S. Cl. ............... 149/19.91; 149/19.9; 149/20; 149/36
[51] Int. Cl. ............................................. C06d 5/06
[58] Field of Search ........... 149/19, 20, 19.91, 19.9, 149/22, 36

[56] References Cited

UNITED STATES PATENTS

| 3,087,844 | 4/1963 | Hudson et al. | 149/19 |
| 3,257,248 | 6/1966 | Short et al. | 149/19 |
| 3,305,523 | 2/1967 | Burnside | 149/19 X |
| 3,476,622 | 11/1969 | Harada et al. | 149/19 |

*Primary Examiner*—Benjamin R. Padgett
*Attorney, Agent, or Firm*—L. S. Jowanovitz

[57] ABSTRACT

The present disclosure relates to novel solid propellant compositions containing a light metal or light metal hydride as fuel, a high energy perchlorate oxidizer, and a binder system consisting of copolymers of ethylene with $\alpha,\beta$-ethylenically unsaturated carboxylic acids cured with aziridine-based resins.

5 Claims, No Drawings

SOLID PROPELLANT CONTAINING ETHYLENE-CARBOXYLIC ACID POLYMERS CURED WITH AZERIDINE-BASED RESINS

BACKGROUND OF THE INVENTION

Solid propellant compositions employed for propulsion of rockets and missiles presently consist of an oxidizer, fuel, and binder material which holds the active ingredients together. As new high-energy oxidizers are developed, presently employed binder systems have proved to be incompatible with many of the new materials and degradation or premature ignition during fabrication and/or storage of the solid propellant composition has frequently resulted.

It is a primary object of the present invention to provide a polymeric binder system which is compatible with high energy perchlorate oxidizers.

This and other objects and advantages of the present invention will become apparent from the following description thereof.

SUMMARY OF THE INVENTION

The present invention consists by weight of from about 5 to about 80 percent of an oxidizer, from about 80 to about 5 percent of a fuel, and from about 5 to about 30 percent of a polymeric binder system. Generally any commonly employed oxidizer such as the alkali metal and ammonium chlorates, perchlorates, or nitrates, and inorganic oxides can be employed in the present invention. However, part of the unique utility of the present invention stems from the fact that high energy perchlorate oxidizers such as nitronium perchlorate, hydroxyl amine perchlorate, hydrazinium perchlorate and hydrazinium diperchlorate, which are normally incompatible with polymeric binders ordinarily employed, can also be compatibly employed therein in conjunction with high energy fuels such as particulate aluminum, beryllium, boron, lithium, magnesium, alloys thereof, and aluminum hydride, beryllium hydride, boron hydride, lithium hydride, and magnesium hydride.

Binder systems employed in the present invention comprise copolymers of ethylene with $\alpha,\beta$-ethylenically unsaturated carboxylic acids cured with an aziridine-based resin. In denoting the relationship in the binder system between the copolymer and the aziridine-based resin, an aziridine equivalent/carboxyl equivalent ratio is employed. The aziridine equivalent is defined as the gram molecular weight of the resin employed divided by the average number of aziridine groups per molecule of resin. The carboxyl equivalent is defined as the gram molecular weight of the polymer employed divided by the number of carboxyl groups present per molecule of binder. Normally, the aziridine equivalent/carboxyl equivalent ratio ranges from about 0.5 to about 2.0.

In the copolymer from about 2 to about 20 percent by weight is the $\alpha,\beta$-ethylenically unsaturated acidic comonomer, and the balance is ethylene. Normally these copolymers have a molecular weight ranging from about 200 to about 5,000.

Acidic comonomers are selected from the group consisting of $\alpha,\beta$-ethylenically unsaturated mono- and polycarboxylic acids and acid anhydrides having from 3 to 8 carbon atoms per molecule and partial esters of such polycarboxylic acids wherein the acid moiety has at least one carboxyl group and the alcohol moiety has from 1 to 20 carbon atoms. Specific examples of such acidic comonomers are acrylic acid, methacrylic acid, crotonic acid, fumaric acid, maleic acid, itaconic acid, maleic anhydride, monomethyl maleate, monoethyl maleate, monomethyl fumarate, and monoethyl fumarate.

Terpolymers which can be employed in the present invention comprise a major proportion of ethylene. From about 5 to about 50 percent based on the weight of the terpolymer is an acidic monomer substantially similar to the acidic comonomer described hereinabove. From about 5 to about 45 percent based on the weight of the terpolymer is an $\alpha,\beta$-ethylenically unsaturated carboxylic acid ester having from 3 to 20 carbon atoms per molecule and containing one or more carboxylate groups all of which are esterified with an alcoholic moiety containing from 1 to 20 carbon atoms. Specific examples of completely esterified $\alpha,\beta$-ethylenically unsaturated carboxylic acids which can be employed as the termonomers in the present invention are the methyl and ethyl esters of acrylic, fumaric, methacrylic, and crotonic acid, and the dimethyl and diethyl esters of maleic, and itaconic acid. Optionally, styrene and derivatives thereof such as $\alpha$-methylstyrene can be employed in place of the completely esterified monomers described above.

Aziridine based curing agents which can be employed in the present invention are members selected from the group consisting of tris[2-methyl-1-aziridinyl]-phosphine oxide (hereinafter described as MAPO), tris[1-aziridinyl]phosphine oxide (hereinafter described as APO), bis(1-aziridinyl)phosphinate terminated polyglycol oxides corresponding to the structural formula:

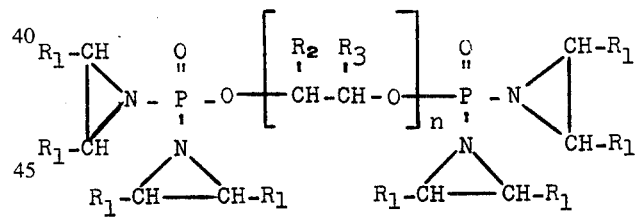

wherein $n$ is an integer ranging from 1 to 5; $R_1$ is —H, —CH$_3$ or C$_2$H$_5$; $R_2$ is —H, —CH$_3$ or —C$_2$H$_5$; and $R_3$ is —H, —CH$_3$ or C$_2$H$_5$, tris[2-(alkyl-substituted-1-aziridinyl)ethyl]-benzenetricarboxylates corresponding to the structural formula:

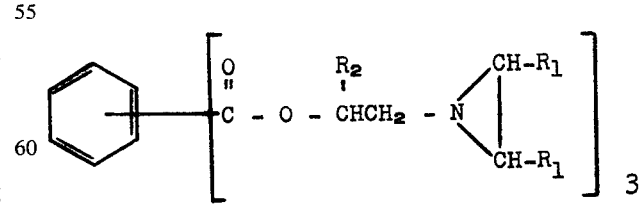

wherein $R_1$ is —H, —CH$_3$ or —C$_2$H$_5$; and $R_2$ is —H, or an alkyl group containing from 1 to 3 carbon atoms, and triaziridinyl melamine corresponding to the formula:

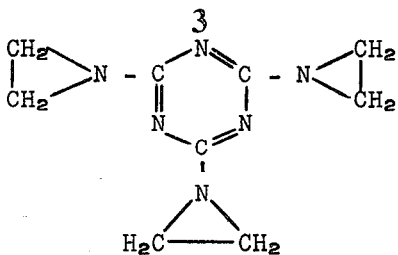

Generally to fabricate the solid propellant compositions of the present invention, the components are admixed at ambient temperatures and cured at slightly elevated temperatures of from about 50°C to about 100°C until a solid, substantially void-free solid propellant grain is produced. All fabrication steps are carried out in an inert atmosphere such as a substantially anhydrous argon or nitrogen atmosphere.

A preferred embodiment of the present invention is the solid propellant composition employing perchlorate oxidizers and light metal or light metal hydride fuels substantially similar to those described hereinabove, and consisting by weight of from about 50 to about 75 percent oxidizer, from about 5 to about 30 percent fuel, from about 10 to about 30 percent of an ethylene/carboxylic acid copolymer cured with an aziridine-based resin wherein the aziridine equivalent/carboxylate equivalent ratio ranges from about 0.5 to about 2.0 and wherein a substantial proportion of the copolymer is ethylene and from about 3 to about 30 percent based on the weight of the copolymer is the acidic comonomer and from about 0.1 to about 3.0 of a commonly employed curing catalyst. Acidic comonomers are selected from the group consisting of acrylic acid, methacrylic acid, crotonic acid, fumaric acid, maleic acid and itaconic acid.

Aziridine based curing agents are selected from the group consisting of bis(aziridinylphosphinate terminated) polyglycols corresponding to the general formula:

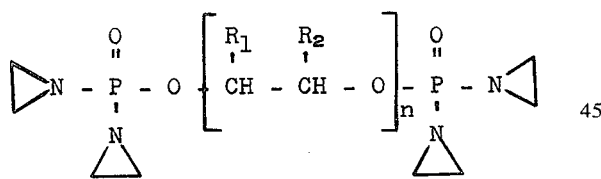

wherein $R_1$ is —H, or —$CH_3$; $R_2$ is —H, or —$CH_3$; and $n$ is an integer ranging from 1 to 3; and triaziridinyl melamine corresponding to the formula:

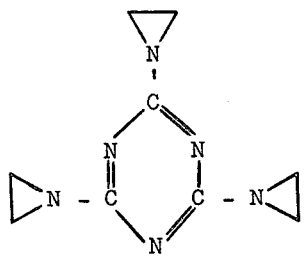

Suitable curing catalysts are members selected from the group consisting of boron trifluoride etherate and tertiary amines.

Propellant compositions are fabricated by admixing the cure catalyst and copolymer at moderate temperatures and adding thereto the curing agent. The resulting blend is agitated until homogeneous. The fuel and oxidizer are carefully admixed with the homogenized blend and the resulting composition is cured at from about 50°C to about 100°C for from about 0.5 hour to about 2 hours to yield a firm elastomeric solid propellant grain.

It should be noted that following vacuum degassing, all mixing and curing steps are carried out in a substantially inert anhydrous argon or nitrogen atmosphere.

EXAMPLE 1

About 0.1 grams of boron trifluoride etherate curing agent was admixed with about 5.18 grams of ethylene/acrylic acid copolymer of about 1,200 molecular weight wherein about 13.9 percent by weight of the copolymer was acrylic acid. The mixture was vacuum degassed at about 80°C and about 29 inches of mercury pressure.

To the so-degassed mixture was added about 1.43 grams of a polyglycol-based aziridine curing agent substantially similar to the one described in Example 3, and the mixture was agitated until homogeneous. About 3.4 grams of nitronium perchlorate oxidizer was blended into the homogenized mixture and the resulting blend cured after about 50 minutes at about 80°C to yield a firm elastomeric solid.

All formulation and curing steps were conducted in a substantially inert argon atmosphere. The formulation proved to be stable for 24–96 hours. After about 24 hours the impact sensitivity as determined on a standard Olin-Matheson Impact Tester was about 50 percent fire level at about 20 Kg. cm.

EXAMPLE 2

A formulation was prepared employing an ethylene/acrylic acid copolymer substantially similar to the one described in Example 4 and wherein the curing agent was triaziridinyl melamine corresponding to the formula:

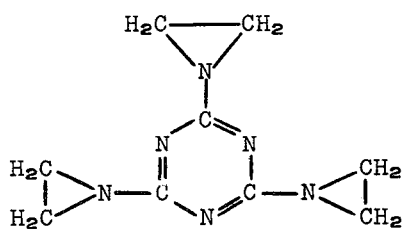

About 5 grams of said copolymer and about 0.6 grams of said curing agent were admixed until substantially homogeneous and vacuum degassed. About 4.8 grams of nitronium perchlorate was carefully blended into the mixture. The formulation was cured in about 8 hours at ambient temperatures to yield a firm elastomeric solid which proved to be stable.

We claim:

1. A solid propellant composition comprising on a weight basis:
   a. from about 5 to about 80 percent of a member selected from the group consisting of hydrazinium perchlorate, hydrazinium diperchlorate, hydroxyl amine perchlorate, nitronium perchlorate, and alkali metal or ammonium nitrates, chlorates or perchlorates as oxidizers;

b. from about 5 to about 80 percent of a member selected from the group consisting of aluminum, beryllium, lithium, magnesium, alloys thereof, and aluminum hydride, beryllium hydride, boron hydrides, lithium hydride, magnesium hydride, or mixtures thereof, as fuel, and c. from about 5 to about 30 percent of a copolymer of ethylene with an α,β-ethylenically unsaturated carboxylic acid cured with an aziridine-based resin as binder, said copolymer having a molecular weight of from 200 to 5,000, and said binder having an aziridine equivalent/carboxyl equivalent ratio of from 0.5 to 2.0.

2. The composition defined in claim 1 wherein the aziridine-based curing agent is a member selected from the group consisting of:

a. tris[2-alkyl-1-aziridinyl]phosphine oxide, wherein the alkyl substituent group is methyl or ethyl, b. tris[1-aziridinyl]phosphine oxide, c. bis(1-aziridinyl)phosphinate terminated polyglycol oxides having the general formula:

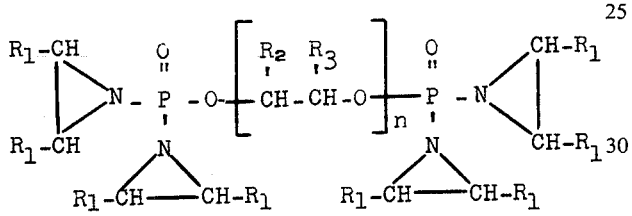

wherein $n$ is an integer ranging from 1 to 5; $R_1$ is —H, —CH$_3$ or C$_2$H$_5$; $R_2$ is —H, —CH$_3$ or —C$_2$H$_5$; and $R_3$ is —H, —CH$_3$ or C$_2$H$_5$, d. tris[2-(alkyl-substituted-1-aziridinyl)ethyl]-benzenetricarboxylates corresponding to the structural formula:

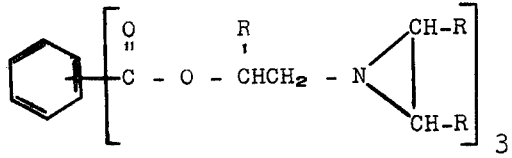

wherein R is independently selected from —H, —CH$_3$ or —C$_2$H$_5$; and e. triaziridinyl melamine, and wherein the polymer is a member selected from the group consisting of, 1. copolymers consisting of a major proportion of ethylene and from about 2 about 20 percent of an acidic comonomer selected from the group consisting of α,β-ethylenically unsaturated mono- and polycarboxylic acids and acid anhydrides having from 3 to 8 carbon atoms per molecule and partial esters of such polycarboxylic acids wherein the acid moiety has at least one carboxyl group and the alcoholic moiety has from 1 to 20 carbon atoms, and 2. a terpolymer comprising a major proportion of ethylene, from 5 to 50 percent by weight of the terpolymer being α,β-ethylenically unsaturated mono- and polycarboxylic acids and partial esters thereof, from 5 to 45 percent by weight of the terpolymer being α,β-ethylenically unsaturated carboxylic acid esters, or styrene and derivatives thereof.

3. A composition as in claim 2 comprising by weight:

a. from 50 to 75 percent oxidizer, b. from 5 to 30 percent fuel, c. from 10 to 30 percent of a copolymer of ethylene with an α,β-ethylenically unsaturated carboxylic acid cured with an aziridine-based resin, and d. from 0.1 to 3.0 percent of boron trifluoride etherate or a tertiary amine as cure catalyst.

4. A composition as in claim 3 wherein the curing agent in the binder is a bis(1-aziridinyl)phosphinate terminated polyglycol oxide of the general formula:

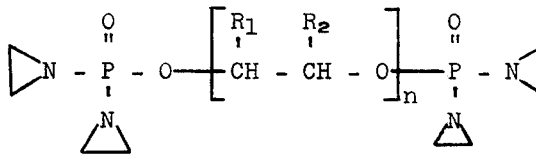

wherein $R_1$ is —H, or —CH$_3$; $R_2$ is —H or —CH$_3$; and $n$ is an integer $1 \leq n \leq 3$; or triaziridinyl melamine.

5. A composition as in claim 2 wherein the binder is a terpolymer cured with an aziridine-based resin, said terpolymer comprising a major proportion of ethylene, from 5 to 50 percent based on the weight of the terpolymer being an acidic comonomer selected from the group consisting of acrylic acid, methacrylic acid, itaconic acid, maleic acid, maleic anhydride, monomethyl maleate, monoethyl maleate, monomethyl fumarate, and monoethyl fumarate, and from 5 to 45 percent based on the weight of the terpolymer being an α,β-ethylenically unsaturated carboxylic acid ester or styrene and derivatives thereof, and including boron trifluoride etherate or a tertiary amine as cure catalyst, said catalyst comprising from 0.1 to 3.0 percent of the total weight of the composition.

* * * * *